United States Patent Office 3,672,875
Patented June 27, 1972

3,672,875
EXTRACTION OF FISSION PRODUCT NOBLE METALS FROM SPENT NUCLEAR FUELS
Adolfo MacCragh, Ellicott City, Md., assignor to W. R. Grace & Co., New York, N.Y.
No Drawing. Filed Sept. 5, 1969, Ser. No. 855,775
Int. Cl. C22b 11/06
U.S. Cl. 75—112    13 Claims

ABSTRACT OF THE DISCLOSURE

A process for separating the fission product metals from spent nuclear fuels, in which the insolubles from the fuel element dissolution are heated in a stream of halide gas to convert the residues to the halides. The ruthenium and rhodium fractions are converted to the complex haloruthenite and halorhodite, followed by dissolution and distillation to remove ruthenium. The rhodium is recovered by neutralizing the undistilled portion and reducing to the metal. Palladium and technetium are recovered from the halides volatilized in the first step of the process.

BACKGROUND OF THE INVENTION

In the normal operation of a nuclear power generating station, the spent fuel is returned periodically to a reprocessing plant where the fuel elements are dissolved. The solution is treated to remove fission products and the unspent portion of the fuel is reused in new fuel elements. Platinum group metals are present as fission products in the reprocessing waste. It has been realized for some time that these wastes are a potential source of some of the platinum group metals, particularly rhodium and palladium, both of which are used fairly extensively as catalyst components, among other applications. At present, their use, particularly that of rhodium, is severely restricted because of their short supply.

Previous processes for effecting the separation of fission product platinum group metals from the reprocessing wastes are applicable to liquid wastes. A large part of the non-volatile fission elements produced during power generation accumulate in the tanks used for storing liquid wastes. The efforts to recover the precious metals from these wastes are hampered by the high radioactivity of the wastes that render their immediate exploitation prohibitive, because of the shielding required. Such a system is economically favorable only after the liquid fission products have been allowed to age for many years so that the fission products with relatively short half lives have disappeared. In addition, the concentration of rhodium and palladium in the liquid wastes is generally in the low parts per million range. Therefore, inconveniently large volumes would have to be handled in order for any significant quantities of the precious metals to be recovered. Furthermore, all of the non-volatile elements between atomic numbers 35 and 46, and between 53 and 63, in addition to large quantities of iron, sodium and sulfate ion, are concentrated in the waste tanks in substantial amounts. thus increasing the difficulty of chemical separation.

I have found that the fission product precious metals can be recovered from the alloys that segregate during fuel irradiation as inclusions within the uranium containing matrix. These alloys are generally mixtures of molybdenum, technetium, ruthenium, rhodium, and palladium in varying proportions; in some cases other elements are also found in them. They are very insoluble in acid, particularly those acids commonly used for fuel element dissolution. They can be attacked by mixtures of aqua regia under higher than atmospheric pressures, or by fusion with alkalis. They settle to the bottom of the tanks and form a sediment that can be removed, washed, and processed to recover the platinum group metals. Should the rate of sedimentation in the dissolver prove too slow for efficient collection of the alloy, then the solution would have to be separated from the particles by filtration, centrifugation, or some other means.

Very broadly, my process comprises the steps of recovering the insolubles from the fuel element dissolution processes, converting the fission product metals to the halides, converting the ruthenium and rhodium fractions to the complex haloruthenite and halorhodite followed by dissolution in a suitable solvent and distilling to remove ruthenium. The rhodium is separated from the undistilled fraction by reducing it to the metal. Some of the halides are carried out of the initial halogenation reaction as volatile salts, which are collected in suitable solvents. Palladium and technetium are recovered from the solution of these volatile fractions.

The first step of my novel process is the recovery of the sediment from the fuel element dissolution tanks. The sludge is collected in a suitable reaction vessel and washed with acid and water to remove surface contaminants.

In the next step of the process, the alloy is placed in a furnace, heated to a temperature of about 400 to 700° C., preferably 500 to 600° C., and subjected to the action of a volatile halogen gas for a period of time sufficient to insure complete conversion of the inclusions to the halides. A practical lower limit to the temperature is set by the reaction rate, the upper limit should not exceed 700° C., and preferably not 600° C., because of the danger of volatilizing appreciable amounts of rhodium and ruthenium halides. The process is most conveniently carried out using chlorine gas, but fluorine or bromine can also be used. The time required for complete conversion of these metals to the chloride form is short (in general, less than an hour), but depends on the particle size of the inclusions, their exact composition and the gas flow, temperature and sample packing.

The volatile and water-soluble chlorides of molybdenum, technetium, and palladium are swept out of the furnace and are collected in a reservoir of dilute acid. The stream of gaseous chlorine is allowed to pass through this reservoir as it leaves the reaction zone and is then recovered so that it may be safely reused. The technetium and palladium are separated from the molybdenum and recovered in a later step of the process.

The non-volatile and water-insoluble chlorides of ruthenium and rhodium remain in the reaction zone. They are removed, washed with water (to eliminate any soluble chlorides, such as those of barium, that may be present) and then converted into the complex chlororhodite and chlororuthenite. This is accomplished by mixing potassium chloride with these solids in a ratio of at least 3 moles of potassium chloride per gram atom of rhodium and ruthenium. The mixture is then placed in a furnace and heated to a temperature of 400 to 650° C., preferably 500 to 600° C., under a second stream of chlorine until all of the precious metal chlorides have been converted to the soluble potassium chlororhodite and potassium chlororuthenite.

It is critically important that the molar ratio of potassium chloride to ruthenium and rhodium be at least 3 to 1 to insure conversion to the complex in the furnace. The molar ratio, however, may be higher than 3 to 1. Although potassium chloride is the preferred salt, other suitably stable chlorides, such as sodium chloride, may be used if desired.

In the next step of the process, the complex salts of rhodium and ruthenium are dissolved in perchloric acid.

After dissolution is complete, the acid solution is heated to a temperature of 110 to 150° C. Since the acid used is an oxidizing acid, the ruthenium is converted to ruthenium tetroxide which is distilled from the reaction vessel and collected in dilute hydrochloric acid or in an alkaline medium (such as dilute aqueous KOH). This fraction is a concentrate of ruthenium which can be worked up to recover ruthenium metal using conventional methods. Instead of perchloric acid, one can distill ruthenium tetroxide by passing a strong oxidizing gas (such as chlorine) through the hot solution. The removal of ruthenium as the oxide can also be accomplished by distillation with hydrochloric acid, after addition of a strong solid oxidizing agent such as potassium or sodium bromates to the solution.

In the next step of the process, the undistilled residue containing rhodium from the distillation vessel is partially neutralized to precipitate a perchlorate salt, which is removed by filtration. The neutralization is carried out to a pH of about 2.5 to 3.0. The most convenient method of effecting this neutralization is with aqueous or gaseous ammonia. However, potassium, rubidium, and cesium perchlorates are not very soluble at lower temperatures (around 0° C.) and the neutralization may be carried out with the hydroxides of K, Rb, or Cs to form these salts if desired. Rhodium may be recovered from the filtrate by treating the solution with hydrogen gas at any suitable temperature below the boiling point. Precipitated metallic rhodium is collected by filtration.

Meanwhile, the acidified solution of the volatile chlorides is treated to recover palladium and technetium therefrom. The acidified solution is reacted with a complexing agent that forms an insoluble filtrate with palladium. A wide variety of reagents may be used for this step. Among them either potassium iodide or dimethyglyoxime lead to quantitative recovery of palladium. Metallic palladium can also be obtained by direct reduction in the solution, for example by adding formic acid, boiling and filtering the precipitated metal. Palladium can also be separated from the solution by precipitating it in the form of hydrous palladium oxide with sodium bromate and mercuric nitrate.

With dimethylglyoxime, this reaction is preferably carried out at temperatures of about 50 to 100° C., with a temperature of about 85° C. being preferred. The dimethylglyoxime is added as a dilute solution in ethanol. The palladium dimethylglyoxime complex is precipitated, filtered and washed with hot water to remove any molybdenum chloride occluded in the filter cake. Instead of filtration, solvent extraction (for example, with chloroform) can be used to separate the palladium complex. The palladium dimethylglyoxime can also be separated from occluded molybdenum or any traces of ruthenium by dissolving it over a filter with concentrated aqueous ammonia. The filtrate, now containing the palladium, is allowed to stand in an open flask or subjected to a vacuum, which removes the ammonia. Very pure palladium dimethylglyoxime then precipitates, which can be rewashed over another filter. The palladium can be recovered from the complex or from $PdI_2$ or from the hydrous oxide as elemental palladium by hydrogen reduction at room temperature.

Technetium is conveniently recovery by treatment of the filtrate of the palladium precipitation with an acetic acid solution of nitron (1,4-diphenyl-3,5-phenylimino-4,5-dihydro-1,2,4-triazole $C_{20}H_{16}N_4$). This reagent complexes the technetium which is separated by filtration. The metal is recovered by reducing the technetium compound under hydrogen, in a crucible at elevated temperature (500 to 1000° C.). Other complexing agents, such as tetraphenyl arsonium perchlorate, may also be used in this step of the process instead of nitron. Alternatively, molybdenum may be separated from the solution before technetium by the addition of 8-hydroxyquinoline. Technetium can then be removed from the filtrate by precipitation with hydrogen sulfide and then recovered as the metal by reduction with hydrogen gas at temperatures greater than 400° C., preferably around 1000° C.

My invention is illustrated by the following specific but non-limiting example.

EXAMPLE

A total of 4 grams of a finely divided alloy consisting of 40% weight molybdenum, 25% weight ruthenium, 12% weight rhodium, 15% weight rhenium (as an analogue of technetium) and 8% weight palladium was placed in an alumina boat, inserted in a combustion tube, and heated to about 550° C. in a tube furnace. Chlorine gas was then passed through the furnace and the volatile chlorides were collected in a solution of 1 normal hydrochloric acid.

The acid solution was heated to 85° C. and 300 ml. of a 1.5% weight ethanolic solution of dimethylglyoxime was added. The resulting precipitate of palladium dimethylglyoxime was filtered and dissolved in concentrated aqueous ammonia. The ammonia was allowed to evaporate from the solution, whereupon very pure palladium dimethylglyoxime precipitated quatitatively.

A solution of nitron was prepared by dissolving sufficient nitron for a 5% weight solution in 5% weight aqueous acetic acid, and 500 ml. of this solution was added to the filtrate. The filtrate slurry was aged for 2 hours and then washed with 500 ml. of ice water. The nitron perrhenate was recovered as a solid by filtration. The rhenium was reduced to metal by heating the filtrate to 1000° C. in hydrogen.

The rhodium and ruthenium chlorides remaining in the boat were mixed with 1.1 times their weight of potassium chloride and heated to 550° C. in a stream of chlorine gas. A 70% conversion of the complexed potassium chlororhodites and potassium chlororuthenites were achieved. These soluble salts were extracted with water and the insoluble residue mixed with additional KCl and rechlorinated. Each successive chlorination gave an approximately 70% weight yield of the water-soluble complex chlorides. Approximately 6 grams of the complexes were recovered. A total of 1250 ml. of 72% perchloric acid was added to the 2500 ml. of solution and the mixture heated to 125° C. in a round-bottom flask connected through a condenser to a receiver containing a 1 normal solution of hydrochloric acid.

Ruthenium was recovered by bubbling the volatile oxide, $RuO_4$, into the hydrochloric acid. The residue of the distillation flask was cooled and treated with ammonia to adjust the pH to 2.5. A voluminous precipitate of ammonium perchlorate formed. The ammonium perchlorate was removed by filtration, washed, and the rhodium in the filtrate was precipitated as the metal by passing hydrogen gas through the solution at a temperature of 50° C. for a period of one-half hour. The rhodium was separated from the solution by filtration. Recovery of essentially pure rhodium was prectically complete.

What is claimed is:

1. A process for separating platinum group metals and technetium from residues of fuel element dissolution which comprises:
    (a) recovering the insolubles from fuel element dissolution processes as insoluble alloys of molybdenum, technetium, ruthenium, rhodium and palladium,
    (b) heating the residues to about 400–700° C. in a stream of a halogen gas selected from the group consisting of fluorine, chlorine or bromine, to convert said residues to the halides and to volatilize molybdenum, technetium and palladium as halides,
    (c) converting the ruthenium and rhodium fractions to chlororuthenite and chlororhodite by mixing with an excess of potassium chloride at an elevated temperature,
    (d) dissolving the chlororuthenite and chlororhodite with a strong oxidizing agent and distilling to recover ruthenium tetroxide which is reduced to ruthenium, (e) reducing the undistilled portion and recovering the rhodium metal, (f) recovering the volatile halides from step (b) in acid solution and treating to recover palladium by forming an insoluble compound at a temperature below 100° C., leaving soluble molybdenum halide and technetium halide and reducing the palladium to the metal, and (g) forming an insoluble complex of technetium and reducing technetium to the metal.

2. The process according to claim 1 wherein the halide gas is chlorine.

3. The process according to claim 1 wherein the ruthenite and rhodite are dissolved in perchloric acid prior to distillation to remove ruthenium as the tetroxide.

4. The process according to claim 1 wherein the undistilled portion from step (d) is neutralized to a pH of about 3.0, filtered, and rhodium metal is precipitated from the filtrate by treatment with a reducing gas.

5. The process according to claim 4 wherein the reducing gas is hydrogen.

6. The process according to claim 1 wherein the palladium is separated from the solution of volatile chlorides by precipitation followed by washing to remove occluded chlorides molybdenum and technetium.

7. The process according to claim 6 wherein the palladium is precipitated from the solution with dimethylglyoxime or potassium iodide.

8. The process according to claim 7 wherein the molybdenum is removed from the precipitate by dissolving the palladium dimethylglyoxime over a filter with concentrated aqueous ammonia, and then allowing said palladium to recrystallize by removing ammonia from the liquid by evaporation.

9. The process according to claim 7 wherein the technetium is removed by adding nitron to the filtrate of the palladium precipitation to form an insoluble nitron pertechnate and recovered by reduction in a reducing gas.

10. The process according to claim 9 wherein the palladium is recovered as the metal by reduction in hydrogen at room temperature.

11. A process for separating platinum group metals and technetium which comprises:

(a) recovering the insolubles from the fuel element dissolution process as insoluble alloys of molybdenum, technetium, ruthenium, rhodium and palladium, (b) heating the residues to a temperature of about 400 to 700° C. in a stream of chlorine gas to convert the molybdenum, technetium and palladium to the chlorides;

(c) converting the ruthenium and rhodium to the potassium chlororuthenite ($K_3RuCl_6$) and potassium chlororhodite ($K_3RhCl_6$) by mixing with an excess of potassium chloride and heating to a temperature of about 400 to 650° C.;

(d) dissolving the potassium chlororuthenite and potassium chlororhodite in a sufficient quantity of an oxidizing acid to convert the ruthenium to $RuO_4$;

(e) distilling ruthenium tetroxide from the mixture by heating to a temperature of about 110 to 150° C.;

(f) separating ruthenium metal from the distillate by reducing in hydrogen and filtering;

(g) separating the salt of the oxidizing acid from the distillation residue and recovering rhodium by reducing in hydrogen and filtering;

(h) recovering palladium from the volatile chlorides collected in step (b) by precipitating the dimethylglyoxime to leave soluble chlorides of molybdenum and technetium, [or iodide complexes] washing to remove occluded chlorides of molybdenum and technetium, and recovering palladium from the complex by reducing to the metal with hydrogen; and (i) precipitating technetium from the solution containing molybdenum chloride [by heating] with nitron, washing, and reducing technetium to the metal at a temperature of 1000° C. with hydrogen.

12. The process according to claim 11 wherein the oxidizing acid is perchloric acid.

13. The process according to claim 11 wherein the reduction in step (g) is carried out at about 50° C. and the reduction in step (h) is carried out at room temperature.

References Cited

UNITED STATES PATENTS

| | | | |
|---|---|---|---|
| 1,281,879 | 10/1918 | Thayer | 75—112 |
| 1,876,943 | 9/1932 | Hull | 75—83 X |
| 2,714,555 | 8/1955 | Stevenson et al. | 75—121 |
| 2,875,040 | 2/1959 | Barabas | 75—121 |
| 3,166,404 | 1/1965 | Hausman | 75—108 X |

L. DEWAYNE RUTLEDGE, Primary Examiner

G. T. OZAKI, Assistant Examiner

U.S. Cl. X.R.

75—83, 108, 121